(12) United States Patent
Heydenrych

(10) Patent No.: US 10,731,083 B2
(45) Date of Patent: Aug. 4, 2020

(54) APPARATUS FOR ENDOTHERMIC REACTIONS

(71) Applicant: University of Pretoria, Pretoria (ZA)

(72) Inventor: Michael David Heydenrych, Centurion (ZA)

(73) Assignee: University of Pretoria, Pretoria (ZA)

(*) Notice: Subject to any disclaimer, the term of this patent is extended or adjusted under 35 U.S.C. 154(b) by 102 days.

(21) Appl. No.: 15/922,862

(22) Filed: Mar. 15, 2018

(65) Prior Publication Data

US 2018/0258349 A1  Sep. 13, 2018

Related U.S. Application Data

(62) Division of application No. 14/898,116, filed as application No. PCT/ZA2014/000027 on Jun. 13, 2014, now Pat. No. 10,041,003.

(30) Foreign Application Priority Data

Jun. 14, 2013 (ZA) .................................. 2013/04409

(51) Int. Cl.
*C10B 49/22* (2006.01)
*C10J 3/46* (2006.01)
(Continued)

(52) U.S. Cl.
CPC .............. *C10B 49/22* (2013.01); *B01J 8/002* (2013.01); *B01J 8/1809* (2013.01); *B01J 8/1827* (2013.01); *B01J 8/1872* (2013.01); *B01J 8/26* (2013.01); *C10B 53/02* (2013.01); *C10B 57/02* (2013.01); *C10B 57/06* (2013.01); *C10J 3/463* (2013.01);
(Continued)

(58) Field of Classification Search
CPC ....................... C10J 2300/1637; C10B 49/22
See application file for complete search history.

(56) References Cited

U.S. PATENT DOCUMENTS 2,445,327 A    7/1948  Keith
3,853,498 A *  12/1974 Bailie .................... C10B 49/22
                                                48/209
(Continued)

FOREIGN PATENT DOCUMENTS

SU      1386635 A1    4/1988
WO   WO 2012/034141   3/2012

*Primary Examiner* — Matthew J Merkling
(74) *Attorney, Agent, or Firm* — Knobbe, Martens, Olson & Bear, LLP

(57) ABSTRACT

A carbonaceous feed pyrolysis apparatus is provided including two or more hot particle fluidised beds, one of which contains a combustion zone, and one or more positive displacement apparatus for the transfer of hot particles beds. Also provided is a bio-oil production process including two or more fluidised beds, a first combustion zone carried out in one or more combustion fluidised beds in which a particulate material is fluidised and heated, and a second pyrolysis zone carried out in one or more pyrolysis fluidised beds in which hot particles heated in the combustion zone are used for pyrolysis of bio-mass, the combustion zone being operated at or about atmospheric pressure at a temperature of from 400° C. to 1100° C., and the pyrolysis zone being operated at a pressure of from atmospheric to 100 Barg at a temperature of from 400° C. to 900° C.

20 Claims, 1 Drawing Sheet

Figure 1:
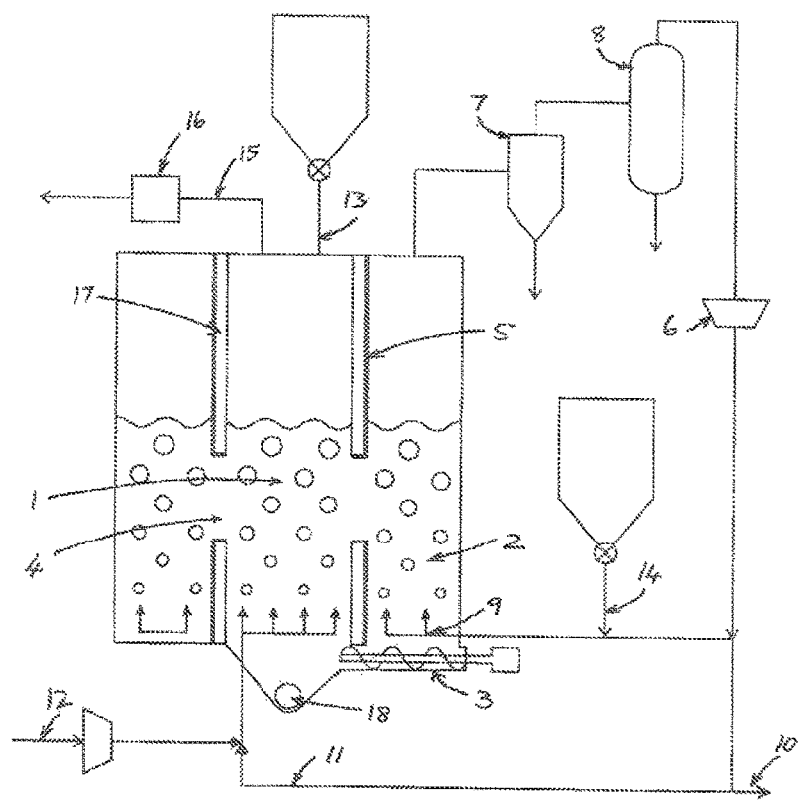

(51) Int. Cl.
*C10B 53/02* (2006.01)
*B01J 8/18* (2006.01)
*B01J 8/26* (2006.01)
*B01J 8/00* (2006.01)
*F23C 10/00* (2006.01)
*F23C 10/01* (2006.01)
*F23G 5/027* (2006.01)
*F23G 5/30* (2006.01)
*C10B 57/02* (2006.01)
*C10B 57/06* (2006.01)

(52) U.S. Cl.
CPC ............ *F23C 10/005* (2013.01); *F23C 10/01* (2013.01); *F23G 5/0276* (2013.01); *F23G 5/30* (2013.01); *B01J 2208/0084* (2013.01); *B01J 2208/00212* (2013.01); *B01J 2208/00274* (2013.01); *B01J 2208/00761* (2013.01); *B01J 2208/00902* (2013.01); *B01J 2208/00938* (2013.01); *C10J 2200/152* (2013.01); *C10J 2300/0916* (2013.01); *C10J 2300/0946* (2013.01); *C10J 2300/0976* (2013.01); *C10J 2300/0996* (2013.01); *C10J 2300/1637* (2013.01); *C10J 2300/1687* (2013.01); *C10J 2300/1807* (2013.01); *C10J 2300/1853* (2013.01); *C10J 2300/1876* (2013.01); *F23G 2201/301* (2013.01); *F23G 2201/304* (2013.01); *F23G 2900/50202* (2013.01); *Y02E 50/14* (2013.01)

(56) References Cited

U.S. PATENT DOCUMENTS

| | | | |
|---|---|---|---|
| 4,082,615 A * | 4/1978 | Komuro | C10B 49/10 201/12 |
| 4,274,941 A | 6/1981 | Janssen et al. | |
| 4,324,620 A | 4/1982 | Ito et al. | |
| 4,459,133 A | 1/1984 | Moss | |
| 4,447,297 A * | 5/1984 | Shang | C10G 1/02 201/31 |
| 4,582,590 A * | 4/1986 | Qader | B01J 19/127 208/407 |
| 5,771,677 A * | 6/1998 | Rohrer | C10B 49/22 110/204 |
| 8,292,977 B2 | 10/2012 | Suda | |
| 8,500,959 B2 * | 8/2013 | Lehto | C10B 49/22 201/12 |
| 2002/0078867 A1 | 6/2002 | Paisley | |
| 2010/0162625 A1* | 7/2010 | Mills | C10C 5/00 48/76 |
| 2011/0201854 A1* | 8/2011 | Kocal | C01B 3/38 585/240 |
| 2013/0019529 A1* | 1/2013 | Song | C10C 5/00 48/111 |
| 2014/0008205 A1 | 1/2014 | Heydenrych | |
| 2014/0296586 A1* | 10/2014 | Chandran | C10G 1/02 585/240 |

* cited by examiner

APPARATUS FOR ENDOTHERMIC REACTIONS

FIELD OF THE INVENTION

The invention relates to an apparatus for endothermic processes. One such type of process is pyrolysis of carbonaceous materials.

BACKGROUND TO THE INVENTION

WO 2012/034141 provided a carbonaceous feed pyrolysis apparatus including two or more hot particle fluidised beds, and one or more positive displacement apparatus for the transfer of hot particles between two or more of the beds. One or more of the fluidised beds may contain a combustion zone. One or more of the fluidised beds may contain a pyrolysis zone. The positive displacement apparatus may be a screw feeder or the like. The apparatus of WO 2012/031414 may include one or more "L" valves between the combustion and pyrolysis zones so that hot particles may flow from the combustion zone or zones to the pyrolysis zone or zones while impeding the flow of gas in the opposite direction.

The inventor has now, after extensive research, identified that the apparatus of WO 2012/034141 has practical limitations and that the heat loss makes it impractical to operate without additional fuel and a need was thus identified for a new and efficient apparatus to carry out these and other endothermic processes.

The inventor thus now proposes the invention described hereinbelow.

SUMMARY OF THE INVENTION

According to a first aspect of the invention, there is provided an endothermic reaction apparatus, said apparatus including:
  two or more fluidised bed zones;
  an apertured divider having one or more aperture therethrough connecting at least two of the fluidised bed zones; and
  a mass transfer device for transferring particulate matter from at least one fluidised bed one to another fluidised bed zone;
wherein
  a second fluidised bed zone gas feed includes a closed gas loop whereby, in use, a portion of the gas product in said zone and is recycled thereto in the closed gas loop so that this gas is used as the gaseous fuel for the first fluidised bed zone, either fully or in part;
  a gas loop purge whereby part of the recycled gas stream from the second fluidised bed zone is purged from the closed gas loop; and
  a flow rate regulator whereby, in use, the flow rate is regulated to a predeterminable rate.

The mass transfer device may transfer particulate matter from the one fluidised bed zone to the another fluidised bed zone below the fluidised bed zones.

The particulate matter may include particulate material of the fluidised bed.

The two or more fluidised bed zones may be in an annular arrangement wherein a first fluidised bed zone is substantially surrounded by a second fluidised bed zone with the apertured divider being located between the first and second fluidised bed zones.

Wherein an annulus may formed between an outer wall of the second fluidised bed zone and the divider between the first and second fluidised bed zones.

The term "concentrically" should not be interpreted to limit the arrangement to a pair of round tubular fluidised bed zones and the geometry thereof is not to be limited as such and includes oval, polygonal, frusto-conical, and the like.

In use, the first fluidised bed gas feed flow rate is set at a suitable high flow rate to ensure fluidisation of the first zone, but not too high to cause excessive entrapment of particles from the bed. Usually this gas will be air, or an oxygen rich gas. Energy is provided to the aforementioned zone by combustion of a fuel with the air. The temperature in this zone may be controlled by controlling the flow rate of the fuel, which may be a solid, liquid or gaseous fuel. Typically therefore there will be residual oxygen in the gas leaving this zone.

According to a second aspect of the invention, there is provided a pneumatic injector for injecting gas and/or pneumatically conveyed solid material into a fluidised bed, said injector protecting the gas and/or solid material from heat transfer by an annulus of cold gas, the injector including a central tube which should not extend into the fluidised bed, but rather extend to slightly short of the bed by approximately one diameter of the outer tube, the injector including circular length of pipe for injecting the gas into the fluidised bed whereby, in use, the gas and solids are injected into the pipe tangentially, preferably with a narrowing of the pipe as it enters the circular pipe, wherein an outer wall of the circular length is aperture and, in use, the apertures act as fluidised bed nozzles.

The arrangement of the circular pipe acts as an eductor to cause gas to circulate rapidly in the circular tube whereby centrifugal force will cause the solid material to move along the outer wall of the circular pipe and holes in the outer wall of the circular pipe will act as fluidised bed nozzles, and the solid is injected into the fluidised bed through these nozzles. The circular movement of the bed allows sawdust/biomass to be fed in one spot without causing a cold spot in the pyrolysis bed.

These nozzles may be directed tangentially to induce a circular motion to the fluidised bed within the annulus.

The circular pipe may be protected from the heat transfer provided by the fluidised bed particles. This may be achieved by providing a shield above the pipe with a small air gap between it and the circular pipe. Such a shield may be angled to allow the fluidised bed particles to slip off into the path of the fluidising gas.

The injection may be of gas alone.

The solid material may be introduced separately using a heat tube auger design.

According to a third aspect of the invention, there is provided an endothermic reaction process, said process including:
  combusting a carbonaceous material in the presence of oxygen in a first fluidised bed zone;
  carrying out one or more endothermic reactions in a second fluidised bed zone separated from the first fluid bed zone by an apertured divider;
  transferring fluidised bed material from the hot first fluidised bed zone through one or more apertures to the second fluidised bed zone; and
  displacing fluidised bed particulate material below the fluidised bed zones by means of a positive displacement mass transfer device.

The temperature in the second fluidised bed zone may be regulated by the rate at which the particulate material below the fluidised bed is displaced.

The height of the two fluidised beds may be self regulated by means of material transfer between the two fluidised beds through the one or more apertures in the divider.

Fluidising gas in the second fluidised bed zone may be recirculated and solid and liquid products may be removed as part of the recirculation loop and a portion of the recirculated gas may be introduced into the second fluidised bed through nozzles.

Where there is a net production of gas in the recirculation loop, it may be removed as a purge This gas may be a desired product of the reaction occurring in second fluidised bed zone.

Excess gas may be returned to the first fluidised bed zone where combustible gases will be burned.

The endothermic process may be a pyrolysis process including pyrolysis of a carbonaceous bio-mass wherein a first combustion zone is carried out in one or more combustion fluidised beds in which a particulate material is fluidised and heated, and a second pyrolysis zone carried out in one or more pyrolysis fluidised beds in which the hot particles heated in the combustion zone are used for pyrolysis of the bio-mass, said combustion zone being operated at a temperature of from 400° C. to 1100° C., typically around 900° C., and the pyrolysis zone being operated at a temperature of from 400° C. to 900° C., typically 450° C. to 600° C.

The pyrolysis zone and the combustion zone may be at substantially the same pressure so that the levels of both are similar and there is minimal flow of gas between the two zones, and may be operated typically at or about atmospheric pressure, but may be operated at higher pressure up to about 100 Barg.

Thus, in this embodiment, the combustion fluidised beds are the first fluidised bed zones of the invention and the pyrolysis fluidised beds are in the second fluidised bed zones.

Pyrolysis gas from the pyrolysis zone may be at least partially recycled to the combustion zone as a source of fuel for the combustion used to heat the particles.

The hot particles may be sand particles, or catalyst particles.

The hot particles may pass through the aperture divider from the combustion zone into the pyrolysis zone.

The pyrolysis zone may be operated at or about atmospheric pressure.

The use of catalyst in the pyrolysis zone may allow more throughput of bio-mass because more $CO_2$ is produced and therefore the process will be less endothermic.

The catalyst is typically a cracking catalyst such as an acidic zeolite.

DESCRIPTION OF EMBODIMENTS OF THE INVENTION

Figure 2:
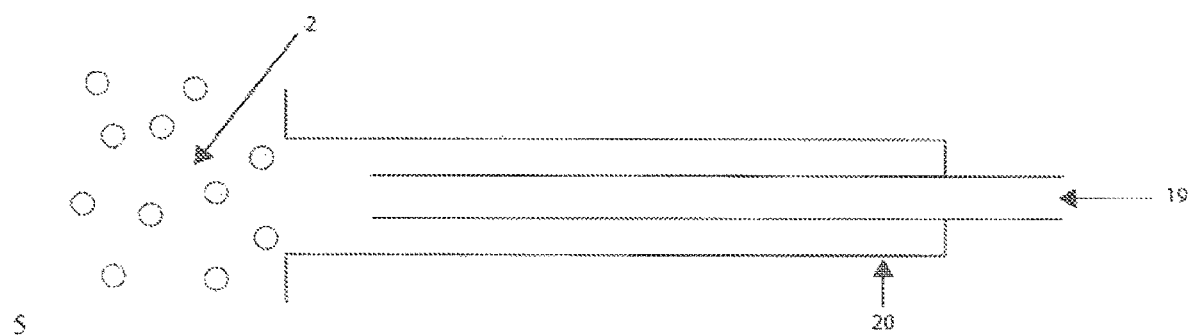

The invention will how be described, by way of non-limiting example only, with reference to the accompanying diagrammatic drawings. In the drawings, FIG. 1 shows a flow diagram of an endothermic reaction apparatus; and FIG. 2 shows a device for feeding heat-sensitive materials into a hot fluidised bed.

In the Figures, a basic endothermic reaction apparatus generally in accordance with the invention is shown. The apparatus consists of two fluidised beds 1 and 2 separated by a vertical divider 5. A positive displacement device such as an auger 3 moves the bed material from the reduction side to the combustion side of the device below the fluidisation zone.

The height of the two fluidised beds is equalised by movement of the bed material through a hole 4 in the vertical divider, from the high temperature side 1 (zone 1) to the low temperature side 2 (zone 2).

The bed material that moves through the hole 4 provides energy to drive reactions that may occur on the reduction side. Energy may also be provided to zone 2 by means of conductive and radiative heat transfer through the dividing wall 5. Energy is provided to zone 1 by means of an exothermic reaction, typically combustion of a fuel 13 using air 12.

The temperature in the reduction zone 2 may be controlled by the speed of the auger 3.

The fluidising gas in zone 2 is recirculated using blower 6. This gas may be cooled, and solid and liquid products may be removed (7 and 8 respectively) as part of the recirculation loop. The gas is introduced into zone 2 through nozzles 9. If there is a net production of gas in the recirculation loop, it may be removed as a purge 10. This may be a desired product of the reaction occurring in fluidised bed 2. The excess gas may be returned to zone 1 through line 11, and combustible gases will be burned in zone 1.

In previous inventions involving dual bed designs, the amount of gas recirculated through 11 or purged through 10 is controlled typically through the pressure in the freeboard above beds 1 and 2. In this invention it is proposed that the flow rate of the gas in streams 10 and 11 is set, and controlled at this set flow rate. This flow rate may be coupled to be proportional to the feed rate of reactant 14 to zone 2. If this set flow rate is less than the net rate of formation of gas in the recirculation loop 6, then there will be a net flow of gas from fluidised bed zone 2 to zone 1 through hole 4. Conversely, if the net flow in streams 10 and 11 is more than the net rate of formation of gas in the recirculation loop 6, then there will be a net flow of gas from fluidised bed zone 1 to zone 2 (and some nitrogen can be expected in lines 10 and 11 from the combustion air).

The total flow rate in streams 10 and 11 should be set according to a ratio proportional to the rate of feed 14. This ratio might change if conditions in zone 2 change (such as the temperature of zone 2).

The fluidized bed 2 may be arranged to surround the hotter fluidised bed 1. In this way, heat losses from the device as a whole are reduced, because the external walls where heat loss occurs are the walls of the colder fluidised bed, which makes thermal insulation easier. An instance of this is to have a vertical cylindrical fluidised bed 1, with the fluidised bed 2 forming an annulus around bed 1.

The nozzles 9 may be directed in such a way to induce a flow in the fluidised bed 2 in a circular motion around the axis of the annulus. This has the advantage that the bed is continually renewed at the location where reactants (stream 14) are introduced into the fluidised bed, thereby avoiding cold spots and prompting good mixing.

The separating wall 5 may be protected by a layer of heat and abrasion resistant material on either or both sides of the separating wall, particularly on the hot side (17) where metals are vulnerable to erosion due to the action of the fluidised bed 1 and the associated high temperatures.

Clinker that forms in the hot fluidised bed may be removed by an additional auger 18.

The outer wall of the annular colder zone 2 can be thermally insulated to prevent heat loss from the device as a whole.

As an example, the device may be used as a pyrolysis apparatus where the material to be pyrolysed is introduced directly into zone 2, char is removed at 7, the stream is cooled and bio-oil is removed at 8. The flow of gas in 11 is chosen to be approximately what can be expected from pyrolysis at the chosen conditions, and typically no gas exits through 10.

The gas provided by stream 11 is mixed with air before entering the combustion fluidised bed 1. Additional fuel (13) may be added to maintain the combustion fluidised bed (1) temperature (typically 850° C. to 950° C.). This fuel may be similar to the material added at 14, but will typically have a larger particle size.

The temperature of the pyrolysis fluidised bed 2 may be increased to increase the amount of gas produced, until the device as a whole is self-sufficient on feed 14, and requiring no fuel 13.

The temperature of the pyrolysis fluidised bed 2 may be increased further to increase the amount of gas produced, and additional gas will be released through 10. In this way, the device may be operated as a gasifier.

It is anticipated that the pyrolysis feed 14 may consist of traditional solid biomass, recycled plastics, car tires or coal, but may also be organic liquids such as glycerol of bio-oil, and this apparatus may be suitable to gasify or reform such feed material to a gas containing low nitrogen levels, using air rather than oxygen as the energy source. When operated as a gasifies, additional steam may be added to zone 2.

The selection of suitable flow rates in streams 10 and 11 allows the device to be operated easily at different pressures, including pyrolysis and gasification at high pressures such as 1-3 MPa. The annular pyrolysis device has a shape that is easily adapted to pressure operation.

The hot gases 15 can be used to generate steam, create shaft work through a turbine, or to heat treat char to give a higher quality product. Residual heat can be used to dry biomass before feeding it to the pyrolysis reactor through 14.

Zone 1 is normally operated as a combustion bed, but may alternatively be operated in a reducing atmosphere in which substantially all of the oxygen is reacted and carbon monoxide forms along with the carbon dioxide. This mode of operation is useful if the fluidised bed is composed mainly of char. Steam gasification can take place in zone 2 by replacing the blower 6 with a single or multi-stage steam eductor-jet pump. The hot gases 15 may then be burned in a secondary combustor/turbine 16 and the energy used as previously described.

Co-generated heat from stream 15 and heat emitted from the cooler represented by 8 can be used off-plant such as steam for process heat or hot water for house heating if the pyrolysis unit replaces a domestic furnace.

The bed material 1 and 2 can be a catalyst to produce targeted products in zone 2. Catalysts typically coke up at higher temperatures, and zone 1 is suitable for combusting such char and regenerating the catalyst. In this way, catalyst can be continually regenerated.

The bed material can be an oxygen carrier. The bed material can be chosen to react with oxygen in the feed material 14 in zone 2, and release such oxygen in zone 1 where it is heated to a higher temperature. An example of such a system is calcium oxide and calcium hydroxide or calcium carbonate.

The device that provides feed material to zone 2 (stream 14) may be injecting heat-sensitive material into a hot zone 2. This may be done using an auger that is partially filled with a liquid such as water or ethanol, promoting heat transfer from the part of the auger in contact with zone 2 to a part of the auger where the heat can be removed by cooling water or cooling air using cooling fins. The tube that houses the auger may be designed in a similar way as a heat tube to keep the auger cool. The auger screw may be hollow to allow the cooling fluid to reach the tip of the screw.

Alternatively, heat sensitive material may be introduced to zone 2 by a pneumatic injector. FIG. 2 shows how pneumatically conveyed solid material 19 is protected from heat transfer at the entrance to zone 2 by an annulus of cold air 20. Together the two gas streams provide the nozzle providing fluidisation gas to zone 2. The central tube should not extend into the bed, but father extend to slightly short of the bed by approximately one diameter of the outer tube.

A similar pneumatic feeder may be used for an annular shape of zone 2 by using a circular length of pipe for injecting the gas. The cool gas and solids are injected into the pipe tangentially, preferably with a narrowing of the pipe as it enters the circular pipe. This will act as an eductor to cause gas to circulate rapidly in the circular tube. Centrifugal force will cause the solid material to move along the outer wall of the circular pipe. Holes in the outer wall of the circular pipe act as fluidised bed nozzles, and the solid is injected into the fluidised bed through these nozzles. These nozzles may be directed tangentially to induce a circular motion to the bed within the annulus.

The circular pipe should be protected from the heat transfer provided by the fluidised bed particles. This can be achieved by providing a shield above the pipe with a small air gap between it and the circular pipe. Such a shield should be angled to allow the fluidised bed particles to slip off into the path of the fluidising gas.

Particles may clog the fluidised bed nozzles. This may be prevented by placing a ball in the circular pipe. The ball continually moves with the gas in the pipe, thereby preventing blockage of the fluidised bed jets. The diameter of the ball should typically be 0.9 to 0.5 times the inner diameter of the circular pipe.

The invention claimed is:

1. An endothermic reaction process, comprising:
providing an endothermic reaction apparatus, comprising:
two or more fluidized bed zones comprising a first fluidized bed zone and a second fluidized bed zone;
a second fluidized bed zone gas feed comprising a closed gas loop equipped with a blower and nozzles;
an apertured divider having one or more apertures therethrough connecting at least two of the fluidized bed zones;
a positive displacement mass transfer device for transferring particulate matter from the first fluidized bed zone to the second fluidized bed zone;
a gas loop purge; and
a flow rate regulator;
combusting a carbonaceous material in a presence of oxygen in the first fluidized bed zone;
carrying out one or more endothermic reactions in a second fluidized bed zone to generate a fluidizing gas, wherein the second fluidized bed zone is separated from the first fluidized bed zone by the apertured divider;
transferring a fluidized bed material from the first fluidized bed zone through the one or more apertures of the apertured divider to the second fluidized bed zone;

displacing fluidized bed particulate material below a fluidized bed of the second fluidized bed zone to the first fluidized bed zone using the positive displacement mass transfer device; and recirculating the fluidizing gas in the second fluidized bed through the closed gas loop using the blower, wherein a first portion of the fluidizing gas produced in the second fluidized bed zone is recycled to the first fluidized bed zone through the closed gas loop, such that the first portion of the recycled gas is used as a gaseous fuel for the first fluidized bed zone, either fully or in part, wherein a second portion of the fluidizing gas from the second fluidized bed zone is purged from the closed gas loop, wherein a flow rate of the second portion of the fluidized gas is regulated to a set flow rate by a flow rate regulator, and wherein a remainder of the recirculated fluidizing gas is introduced into the second fluidizing bed through the nozzles.

2. The endothermic reaction process of claim 1, wherein a temperature in the second fluidized bed zone is regulated in relation to a rate at which the fluidized particulate material below the fluidized bed of the second fluidized bed zone is displaced.

3. The endothermic reaction process of claim 1, wherein a height of a fluidized bed of the first fluidized bed zone and a height of the fluidized bed of the second fluidized bed zone are self-regulated by material transfer between the two fluidized beds through the one or more apertures of the apertured divider.

4. The endothermic reaction process of claim 1, wherein solid and liquid products are removed as part of the closed gas loop.

5. The endothermic reaction process of claim 4, wherein the second portion of the fluidized gas corresponds to a net production of gas in the closed gas loop.

6. The endothermic reaction process of claim 1, wherein the process is a pyrolysis process comprising pyrolysis of a carbonaceous bio-mass, wherein a first combustion zone is carried out in one or more combustion fluidized beds in which a particulate material is fluidized and heated, and wherein a second pyrolysis zone is carried out in one or more pyrolysis fluidized beds in which the particulate matter fluidized and heated in the combustion zone is used for pyrolysis of the bio-mass, wherein the first combustion zone is operated at a temperature of from 400° C. to 1100° C., and wherein the second pyrolysis zone is operated at a temperature of from 400° C. to 900° C.

7. The endothermic reaction process of claim 6, wherein the second pyrolysis zone and the first combustion zone are at substantially a same pressure, so that levels of both beds are similar and so that there is a minimal flow of gas between the second pyrolysis zone and the first combustion zone, and wherein the endothermic reaction process is operated at a pressure of from atmospheric pressure to a pressure of 100 Barg.

8. The endothermic reaction process of claim 6, wherein the one or more combustion fluidised beds are in the first fluidized bed zone and the one or more pyrolysis fluidised beds are in the second fluidized bed zone, and wherein pyrolysis gas from the second pyrolysis zone is at least partially recycled to the first combustion zone as a source of fuel for the combustion used to heat the particulate matter.

9. The endothermic reaction process of claim 6, wherein the particulate matter fluidized and heated in the combustion zone is selected from the group consisting of sand particles, catalyst particles, and combination thereof, and wherein the particulate matter fluidized and heated in the combustion zone passes through the one or more apertures of the apertured divider from the combustion zone into the pyrolysis zone.

10. The endothermic reaction process of claim 9, wherein the pyrolysis zone is operated at atmospheric pressure.

11. The endothermic reaction process of claim 9, wherein the catalyst is selected from the group consisting of a cracking catalyst and an acidic zeolite.

12. The endothermic reaction process of claim 1, wherein an annulus is formed between an outer wall of the second fluidized bed zone and the apertured divider.

13. The endothermic reaction process of claim 1, wherein a gas flow rate of the first fluidized bed zone is sufficient to ensure fluidization of the first fluidized bed zone without excessive entrapment of particles from the first fluidized bed zone, wherein the gas is air or an oxygen-rich gas, and wherein a temperature in the first fluidized bed zone is controlled by controlling a flow rate of a fuel into the first fluidized bed zone, and wherein residual oxygen is in the gas leaving the first fluidized bed zone.

14. The endothermic reaction process of claim 1, wherein a gas and/or a pneumatically conveyed solid material is injected tangentially into one of the two or more fluidized bed zones by a pneumatic injector including a circular length of pipe for injecting the gas.

15. The endothermic reaction process of claim 14, wherein the circular length of pipe extends to short of the bed by approximately one diameter of an outer tube in which the circular length of pipe is situated, wherein an air gap is provided between the circular length of pipe and the outer tube.

16. The endothermic reaction process of claim 15, wherein the circular length of pipe narrows as it enters the outer tube.

17. The endothermic reaction process of claim 15, wherein an outer wall of the outer tube is apertured such that, in use, the apertures act as nozzles, and wherein the pneumatic injector protects the gas and/or the pneumatically conveyed solid material from heat transfer by an annulus of a cold gas.

18. The endothermic reaction process of claim 1, wherein a solid material is introduced into one of the two fluidized bed zones using a heat tube auger.

19. The endothermic reaction process of claim 1, wherein a total flow rate of the first portion and the second portion are controlled to a set flow rate proportional to a feed rate of the reactants to the second fluidizing bed zone.

20. The endothermic reaction process of claim 1, wherein the nozzles comprise a circular pipe in which is placed a ball having a diameter of from 0.9 to 0.5 times an inner diameter of the circular pipe, wherein the ball is adapted to continually move with gas in the pipe, thereby preventing blockage of the nozzles.

* * * * *

UNITED STATES PATENT AND TRADEMARK OFFICE
CERTIFICATE OF CORRECTION

Page 1 of 2

PATENT NO. : 10,731,083 B2
APPLICATION NO. : 15/922862
DATED : August 4, 2020
INVENTOR(S) : Michael David Heydenrych It is certified that error appears in the above-identified patent and that said Letters Patent is hereby corrected as shown below:

In the Specification

In Column 1, Line 3 (approx.), before "FIELD OF THE INVENTION" insert --Incorporation by Reference to Related Applications--.

In Column 1, Line 9, insert --This application is a divisional of U.S. Application No. 14/898,116, filed December 11, 2015, which is the national phase under 35 U.S.C. §371 of prior PCT International Application No. PCT/ZA2014/000027, which has an International Filing Date of Jun. 13, 2014, which designates the United States of America, and which claims priority to South Africa Application No. 2013/04409 filed Jun. 14, 2013. Each of the aforementioned applications is incorporated by reference herein in its entirety, and each is hereby expressly made a part of this specification.--.

In Column 1, Line 49, delete "product" and insert --produced--.

In Column 2, Line 10, delete "entrapment" and insert --entrainment--.

In Column 2, Line 11, delete "oxygen rich" and insert --oxygen-rich--.

In Column 2, Line 27, delete "circular" and insert --a circular--.

In Column 3, Line 31, delete "both" and insert --both beds--.

In Column 3, Line 34, delete "pressure" and insert --pressures--.

In Column 3, Line 58, delete "how" and insert --now--.

In Column 4, Line 60, delete "prompting" and insert --promoting--.

In Column 5, Line 26, delete "tires" and insert --tyres--.

Signed and Sealed this
Thirteenth Day of October, 2020

Andrei Iancu
*Director of the United States Patent and Trademark Office*

CERTIFICATE OF CORRECTION (continued)
U.S. Pat. No. 10,731,083 B2

In Column 5, Line 27, delete "of" and insert --or--.

In Column 5, Line 31, delete "gasifies," and insert --gasifier,--.

In Column 6, Line 15 (approx.), delete "father" and insert --rather--.